United States Patent
Xiao et al.

(10) Patent No.: US 12,210,380 B2
(45) Date of Patent: Jan. 28, 2025

(54) GLASSES WAISTBAND-TYPE COMPUTER DEVICE

(71) Applicant: Xiaosong Xiao, Fujian (CN)

(72) Inventors: Xiaosong Xiao, Fujian (CN); Zhihua Ni, Fujian (CN); Kaiwei He, Fujian (CN)

(73) Assignee: Xiaosong Xiao, Fujian (CN)

( * ) Notice: Subject to any disclaimer, the term of this patent is extended or adjusted under 35 U.S.C. 154(b) by 0 days.

(21) Appl. No.: 17/918,491

(22) PCT Filed: Jan. 18, 2021

(86) PCT No.: PCT/CN2021/072409
§ 371 (c)(1),
(2) Date: Oct. 12, 2022

(87) PCT Pub. No.: WO2021/147797
PCT Pub. Date: Jul. 29, 2021

(65) Prior Publication Data
US 2023/0140957 A1    May 11, 2023

(30) Foreign Application Priority Data
Jan. 23, 2020    (CN) .......................... 202010076919.4

(51) Int. Cl.
*G06F 1/16*   (2006.01)
*G02B 27/01*   (2006.01)
*G06F 3/02*   (2006.01)
*G06F 3/0354*   (2013.01)

(52) U.S. Cl.
CPC ......... *G06F 1/163* (2013.01); *G02B 27/0172* (2013.01); *G06F 3/0221* (2013.01);
(Continued)

(58) Field of Classification Search
CPC ........ G06F 3/011; G06F 3/012; G06F 3/0202; G06F 3/021; G06F 1/163;
(Continued)

(56) References Cited

U.S. PATENT DOCUMENTS

| 5,491,651 A | * | 2/1996 | Janik | ...................... G06F 1/163 361/679.55 |
| 2004/0252077 A1 | | 12/2004 | Terasaki | |

(Continued)

FOREIGN PATENT DOCUMENTS

| CN | 205844639 U | 12/2016 |
| CN | 106773067 A | 5/2017 |

(Continued)

*Primary Examiner* — Ryan A Lubit

(57) ABSTRACT

The invention discloses a glasses waistband-type computer device, comprising a waistband body, wherein the middle of the front of the waistband body or other parts of the waistband body is detachably installed with a smartphone, and the front of the waistband body is further provided with a left keyboard located on the left side of the waistband wearer's navel and a right keyboard located on the right side of the waistband wearer's navel; the left and right keyboards are connected to the smartphone in a wired manner or a wireless including a Bluetooth manner. During man-machine interaction, the user wears a waistband so that the left keyboard is located to the left of the navel and the right keyboard is located to the right, to form a waistband keyboard. The invention is novel in structure, convenient to use, easy to carry, and can provide a good man-machine interaction mode.

4 Claims, 2 Drawing Sheets

(52) U.S. Cl.
CPC .. *G06F 3/03547* (2013.01); *G02B 2027/0123* (2013.01); *G02B 2027/0178* (2013.01); *G06F 2203/0331* (2013.01)

(58) Field of Classification Search
CPC ..... G06F 2203/0331; G06F 2203/0384; G02B 26/02; G02B 27/0172; G02B 2027/0118; G02B 2027/0123; G02B 2027/0178; A45C 11/00; A45C 2011/002; A45F 3/005; A45F 5/021; A45F 2003/144; A45F 2200/0516; A45F 2200/0525
See application file for complete search history.

(56) References Cited

U.S. PATENT DOCUMENTS

| | | | | |
|---|---|---|---|---|
| 2014/0240313 A1* | 8/2014 | Varga | ............... | H04N 13/383 345/419 |
| 2015/0138065 A1* | 5/2015 | Alfieri | ............... | G02B 27/017 345/156 |
| 2016/0063762 A1* | 3/2016 | Heuvel | ............... | G06F 3/011 345/633 |
| 2017/0052379 A1 | 2/2017 | Yang et al. | | |
| 2020/0074724 A1* | 3/2020 | Mathur | ............... | G06F 3/013 |

FOREIGN PATENT DOCUMENTS

| | | |
|---|---|---|
| CN | 208207644 U | 12/2018 |
| CN | 208239923 U | 12/2018 |
| CN | 208239924 U | 12/2018 |
| CN | 109189279 A | 1/2019 |
| CN | 110989781 A | 4/2020 |
| CN | 111240414 A | 6/2020 |
| CN | 111240415 A | 6/2020 |
| CN | 210867672 U | 6/2020 |
| CN | 211506034 U | 9/2020 |

* cited by examiner

GLASSES WAISTBAND-TYPE COMPUTER DEVICE

1. TECHNICAL FIELD

The invention relates to the technical field of mobile man-machine interaction, in particular to a glasses waistband-type computer device.

2. BACKGROUND ART

Since the invention of the computer in 1946, man-machine interaction technology has always been a key shortcoming affecting the development of computer technology. From the initial man-machine interaction technology of perforated paper tape input and output to the present, only two great inventions have become milestones leading the development of computer technology: one is the man-machine interaction technology that leads the popularization of personal computers in thousands of households, and the combination of keyboard, mouse and window icon operation and display system; the other is the mobile man-machine interaction technology that allows 5.6 billion people in the world to use smartphones as a necessary tool to touch and control capacitive screens. However, developers have so far been unable to create suitable mobile man-machine interaction technology for technology and productivity computing, and the mobile man-machine interaction technology of finger touch control capacitive screen is also unable to lead complex technology and productivity computing into the mobile terminal field because of its inherent shortcomings in simple human language.

Technical Problems

AR, VR, robots, Internet of Vehicles, artificial intelligence, Internet of Everything, cloud computing and other technologies all require technology and productivity computing to enter the mobile Internet; however, the gap in mobile man-machine interaction technology has been insurmountable for many years, and people need innovative mobile man-machine interaction technology to make up for this key technical shortcoming.

3. SUMMARY OF THE INVENTION

The invention provides a glasses waistband-type computer device, which is novel in structure, convenient to use, easy to carry, and can provide a good man-machine interaction mode.

The invention adopts the following technical solutions.

A glasses waistband-type computer device, comprising a waistband body, wherein the middle of the front of the waistband body or other parts of the waistband body is detachably installed with a smartphone, and the front of the waistband body is further provided with a left keyboard located on the left side of the waistband wearer's navel and a right keyboard located on the right side of the waistband wearer's navel; the left and right keyboards are connected to the smartphone in a wired manner or a wireless including a Bluetooth manner;

the smartphone can be a bar smartphone or a screen folding smartphone; the left keyboard and the right keyboard are both folding keyboards; the positional arrangement of the English letters of the keys on the keyboard is the same as the positional arrangement of the English letters of the keys of the qwert keyboard of the prior art, wherein the left keyboard contains at least 15 letter keys of Q, W, E, R, T, A, S, D, F, G, Z, X, C, V, and B, which are operated by the waistband wearer's left hand, and the right keyboard contains at least 11 letter keys of Y, U, I, O, P, H, J, K, L, N, and M, which are operated by the waistband wearer's right hand; the English letters are arranged in the direction that the foot of the word faces the waistband wearer's head, and the head of the word faces the waistband wearer's foot;

the glasses waistband-type computer device is further provided with a glasses display connected by a wired connection or a wireless screen projection connection for receiving the information displayed by the smartphone; the waistband wearer carries an accompanying mouse; the back or other surfaces of the waistband body is further installed with an auxiliary power supply.

When the glasses display is working, the projected image to be displayed is sent to the user's eyes through the optical path; the content area in the projected image is adjustable in size, at the same time, the glasses display forms an opaque area with adjustable size by an electrically controlled dimming screen in front of an optical synthesizer lens, so that the content area of the projected image projected to the user's field of vision can be displayed in the opaque area of the electrically controlled dimming screen in the user's field of view, which enables the user of the computer device to obtain an opaque screen image information display in his moving visual field environment that is only available in the stationary visual field of the PC desktop computer when he is sitting and using the PC desktop computer, and provides a computing device that can enhance human activity anytime and anywhere;

the glasses display comprises a glasses bracket worn on the head, and the glasses bracket is equipped with a pair of optical synthesizer lenses; the peripheral side of the optical synthesizer lens is provided with a microdisplay for generating projected image signals; the front of the optical synthesizer lens is provided with an electrically controlled dimming screen that can be set to a transparent state; the dimming screen is an electroluminescence color-modulating and dimming material screen; the selection range of the electroluminescence color-modulating and dimming material screen includes but is not limited to a liquid crystal display dimming screen LCD or an organic electroluminescence display dimming screen OLED;

the microdisplay comprises a driving module; the driving module is connected to the electrically controlled dimming screen that can be set to a transparent state, and can control part or all of the area of the electrically controlled dimming screen to a transparent state;

when the glasses display is working, the area of the electrically controlled dimming screen that is not turned into an opaque state is a transparent area; the wearer can see the environment behind the electrically controlled dimming screen through the transparent area; the driving module drives the electrically controlled dimming screen so that the opaque area of the electrically controlled dimming screen corresponds to the content area of the projected image, which enables the content area of the projected image to be displayed at the opaque area of the electrically controlled dimming screen in the user's field of vision; the content area in the projected image is adjustable in size, to provide the user of the computer device with different sizes of screen display images required.

The accompanying mouse is a sliding touch mouse located between two keyboards or on the waistband, or a ring mouse of the prior art worn on the fingers of the waistband wearer, or a smartphone touch screen mouse equipped with the screen touch mouse APP on the waistband body; any one of the three kinds of mice can be cooperated with the left keyboard and the right keyboard to implement mobile man-machine interaction for inputting control instructions to the smartphone;

when it is not necessary to cooperate with the keyboard, a small wireless mouse or a Bluetooth touchpad mouse can be used alone in the pocket of the waistband wearer to implement mobile man-machine interaction for inputting control instructions to the smartphone.

The waistband body is provided with an auxiliary power supply, and the left side or the right side of the auxiliary power supply is installed with an auxiliary power supply controller electrically connected to the auxiliary power supply; the controller is provided with a charging control module for directly connecting the smartphone, the left and right keyboards, the touch mouse to supply power for battery life, a docking station module, and an expansion external connection port; the expansion external connection port includes but is not limited to an external charging port, an external video port, an external audio port, a TF/SD card port, and a USB port; the auxiliary power supply provides the data cable connection position plug for the smartphone, which extends the multi-device interface outside the smartphone and connects directly to supply power, so as to solve the problem of poor battery life of traditional mobile phones, frequent charging and connection of multi-device expansion outside the machine.

The mobile operating system includes iOS, Android, or Harmony OS; the PC desktop operating system includes Win10, YOZO, RedFlag Linux, or Remix OS;

a man-machine interaction method of the glasses waistband-type computer device, wherein it adopts the glasses waistband-type computer device of Claim 1 or 2; the left and right keyboards and at least one accompanying mouse are connected to the smartphone, and the man-machine interaction interface of the Windows operating system is used to select one display on the display screen of the smartphone or the display screen of the glasses display in a single-screen mode, or it can be displayed on the display screen of the smartphone and the display screen of the glasses at the same time in a synchronous or extended manner to implement a mobile man-machine interaction that can be used when walking;

when mobile man-machine interaction is implemented, a PC desktop computer operating system can be used for the smartphone; the PC desktop computer operating system is either a PC desktop computer operating system of the cloud host called by the cloud computer APP on the smartphone, or a PC desktop computer operating system installed in the smartphone; the operating system installed in the smartphone and the original pre-installed mobile operating system can be switched with each other;

the mobile man-machine interaction method brings PC computers that have not entered the mobile field for many years into the mobile field, so that new technologies such as robots, big data, artificial intelligence and the Internet of Things can have a mobile platform with more efficient control;

the mobile man-machine interaction method enables cloud computing, which accounts for the majority of scientific and technological productivity calculations, to enter the mobile field, and simultaneously enables the operating system software of various desktop PC computers to enter the mobile field without modification, which solves a long-standing problem.

The mobile man-machine interaction further comprises a pair of headsets on the glasses display provided on the left and right ears, and the headsets implement man-machine interaction for inputting and receiving audio information for the smartphone; the headset are connected to the smartphone in a wired manner or a wireless including a Bluetooth manner.

When the computer device needs to be used for publicity or to beautify the device, the device user can operate the smartphone to display video or display images through the display screen.

The smartphone is provided with an APP that uses a navigation module to detect the user's walking speed, and automatically or manually adjusts the size of the content area in the projected image according to the walking speed;

when the user walks fast or is in a running state, the content area can be automatically or manually adjusted to a smaller man-machine interaction output screen in the shape of a moving banner at the lower part of the user's field of vision;

when the user rambles, the content area can be automatically or manually adjusted to the size of the lower part of the user's field of vision, such as the man-machine interaction output screen of the laptop display screen or the PC desktop computer display screen;

when the user stops walking or sits down, the content area can be automatically or manually adjusted to a man-machine interaction output image with a size in the center of the user's field of vision, such as a wall-mounted large-screen display.

The smartphone of the glasses waistband-type computer device comprises a 5G communication module, which can indirectly call various cloud computing hosts of different operating systems at a high speed by means of built-in APPs, and can also implement man-machine interaction with laptops, PC desktop computers, TVs, wall-mounted large-screen displays, projection equipment, VR equipment, AR equipment wired connection or wireless projection screen connection in addition to glasses displays.

A use method of the glasses waistband-type computer device, wherein the glasses display of Claim 1 or 2 comprises a glasses bracket worn on the head, and the glasses bracket is equipped with a pair of optical synthesizer lenses; the peripheral side of the optical synthesizer lens is provided with a microdisplay for generating projected image signals, and the content area in the projected image is adjustable in size; the front of the optical synthesizer lens is provided with an electrically controlled dimming screen, and the microdisplay comprises a driving module; the driving module is connected to the electrically controlled dimming screen that can be set to a transparent state, and can control part or all of the area of the electrically controlled dimming screen to a transparent or opaque state;

when all areas of the electrically controlled dimming screen are controlled to a transparent state, the optical synthesizer lens superimposes the projected image with adjustable size of the content area from the microdisplay on the image formed from the real environment field of view through the electrically controlled dimming screen, to form the display image output of AR with screens of different sizes, which enables the glasses waistband-type computer device with the movable keyboards and mouse to be a movable interactive AR mobile computer with various sizes of screen displays;

when all areas of the electrically controlled dimming screen are controlled to an opaque state, there is only the display image output of the VR formed by the VR projection with the content area of the microdisplay adjustable in size on the optical synthesizer lens, which enables the glasses waistband-type computer device with the movable keyboards and mouse to be a movable interactive VR mobile computer with various sizes of screen displays;

when the local area of the electrically controlled dimming screen matches the adjusted display shape and size from the projected content area of the microdisplay and is controlled to an opaque state, and the remaining areas around the local area are controlled to a transparent state, the optical synthesizer lens superimposes the projected image from the microdisplay on the opaque image of the electrically controlled dimming screen to form a superimposed image, and the superimposed image is combined with the surrounding real image formed by the real environment through the electrically controlled dimming screen in the user's field of vision, so that the user's field of view has an image and display area similar to a PC display screen, which enables the glasses waistband-type computer device with the movable keyboards and mouse to be a mobile interactive wearable mobile computers with various sizes of computer display screens.

Advantageous Effects

Compared with the prior art, the invention has the following advantageous effects: the invention is novel in structure, reasonable in design, small in size, light in weight, convenient to use, easy to carry, and strong in practicability; it not only has the basic waistband function, but also realizes the mobile man-machine interaction, which is beneficial for the user to work outside, and makes up for the shortcomings of the key technologies of mobile man-machine interaction that have existed for many years.

In the invention, since the glasses display device can block external strong light with an electrically controlled dimming screen that can adjust the transmittance of its light transmission area as needed when displaying AR content and PC-like computer display content that enhances the behavior of active people, therefore, it can effectively prevent the external strong light from affecting the projection effect of the lens display area; in addition, since the display content (AR content and PC-like computer display content that enhances the behavior of active people) is based on a black LCD screen, therefore, the projected image of the glasses display can achieve a higher contrast in the user's field of vision, which is more suitable for use in outdoor environments; moreover, since the glasses display can automatically adjust the size of the interactive interface according to the user's walking speed, the interference to the visual field of the user in the walking state is also reduced.

4. BRIEF DESCRIPTION OF ACCOMPANY DRAWINGS

The invention will be further described in detail hereinafter with reference to the drawings and specific embodiments:

IN THE FIGURES

10 refers to the waistband body; 11 refers to the left keyboard; 12 refers to the smartphone; 13 refers to the right keyboard; 14 refers to the auxiliary power supply; 141 refers to the auxiliary power supply controller;

15 refers to the optical synthesizer lens; 16 refers to the electrically controlled dimming screen; 17 refers to the microdisplay; 20 refers to the opaque area;

100 refers to the opaque area when the display size gear n is 0; 101 refers to the opaque area when the display size gear n is 1; 102 refers to the opaque area when the display size gear n is 2; 103 refers to the opaque area when the display size gear n is 3;

A100 refers to the projected image in the opaque area in the user's field of vision when the display size gear n is 0;

A101 refers to the projected image in the opaque area in the user's field of vision when the display size gear n is 1;

A102 refers to the projected image in the opaque area in the user's field of vision when the display size gear n is 2;

A103 refers to the projected image in the opaque area in the user's field of vision when the display size gear n is 3;

A111 refers to the transparent area on the electrically controlled dimming screen 16 that has not been turned into an opaque state.

5. SPECIFIC EMBODIMENT OF THE INVENTION

Figure 1:
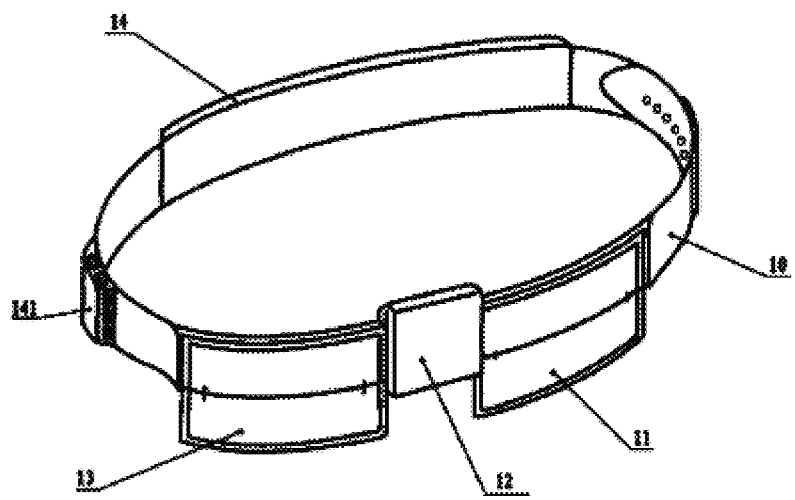
FIG. 1 is a schematic diagram according to the invention.
Figure 2:
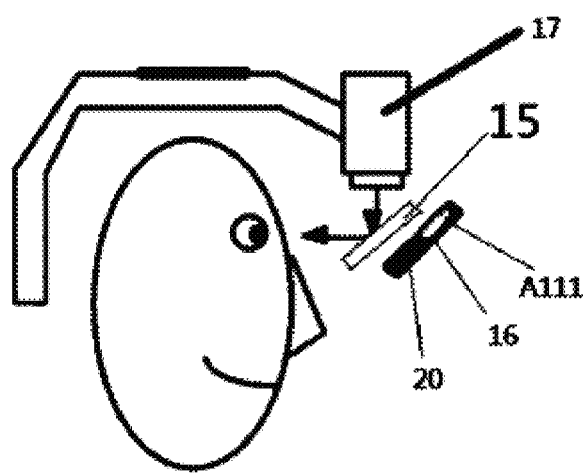
FIG. 2 is a principle schematic diagram of glasses display according to the invention.
Figure 3:
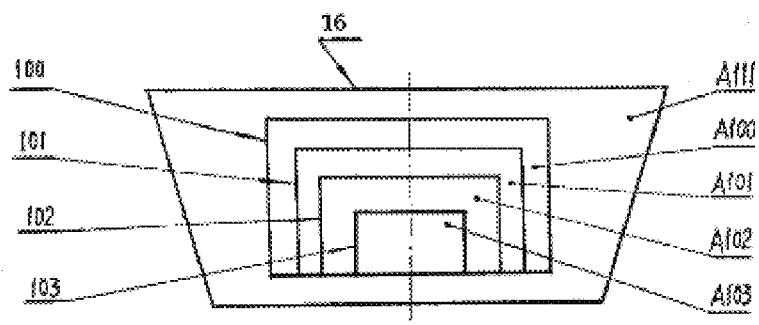
FIG. 3 is a schematic diagram showing the matching between the opaque areas of the electrically controlled dimming screens and the corresponding projected images when the display size gears n are 0, 1, 2, and 3.
Figure 4:
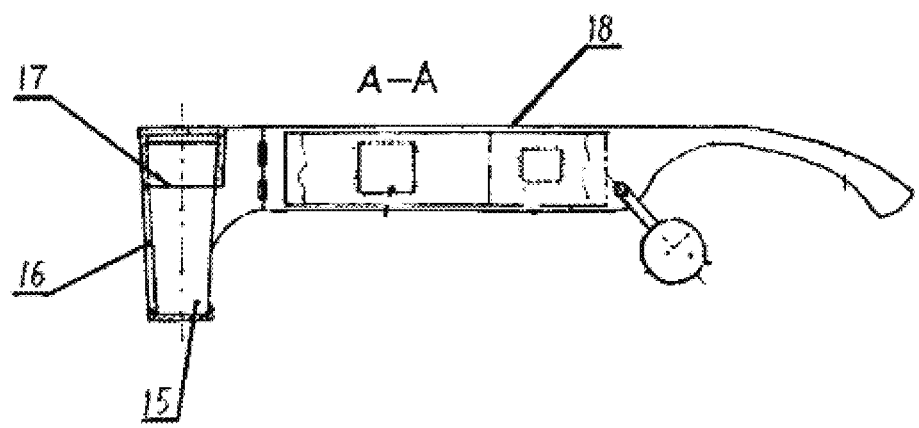
FIG. 4 is a schematic diagram of the glasses display according to the invention.
Figure 5:
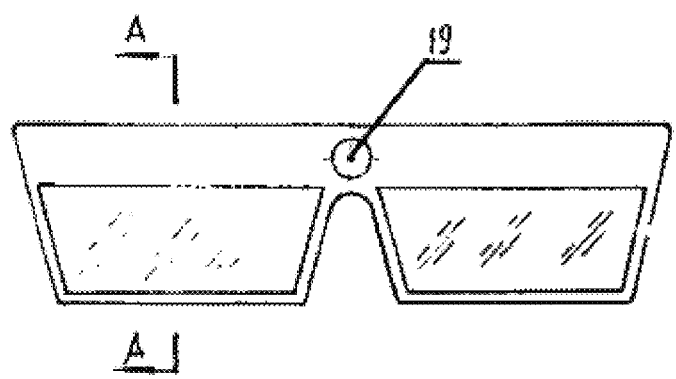
FIG. 5 is another schematic diagram of the glasses display according to the invention.

As shown in FIGS. 1-5, a glasses waistband-type computer device, comprising a waistband body 10, wherein the middle of the front of the waistband body or other parts of the waistband body is detachably installed with a smartphone 12, and the front of the waistband body is further provided with a left keyboard 11 located on the left side of the waistband wearer's navel and a right keyboard 13 located on the right side of the waistband wearer's navel; the left and right keyboards are connected to the smartphone in a wired manner or a wireless including a Bluetooth manner;

the smartphone can be a bar smartphone or a screen folding smartphone; the left keyboard and the right keyboard are both folding keyboards; the positional arrangement of the English letters of the keys on the keyboard is the same as the positional arrangement of the English letters of the keys of the qwert keyboard of the prior art, wherein the left keyboard contains at least 15 letter keys of Q, W, E, R, T, A, S, D, F, G, Z, X, C, V, and B, which are operated by the waistband wearer's left hand, and the right keyboard contains at least 11 letter keys of Y, U, I, O, P, H, J, K, L, N, and M, which are operated by the waistband wearer's right hand; the English letters are arranged in the direction that the foot of the word faces the waistband wearer's head, and the head of the word faces the waistband wearer's foot;

the glasses waistband-type computer device is further provided with a glasses display connected by a wired connection or a wireless screen projection connection for receiving the information displayed by the smartphone; the waistband wearer carries an accompanying mouse; the back or other surfaces of the waistband body is further installed with an auxiliary power supply.

When the glasses display is working, the projected image to be displayed is sent to the user's eyes through the optical path; the content area in the projected image is adjustable in size, at the same time, the glasses display forms an opaque area 20 with adjustable size by an electrically controlled dimming screen 16 in front of an optical synthesizer lens 15, so that the content area of the projected image projected to the user's field of vision can be displayed in the opaque area of the electrically controlled dimming screen in the user's field of view;

the glasses display comprises a glasses bracket worn on the head, and the glasses bracket is equipped with a pair of optical synthesizer lenses; the peripheral side of the optical synthesizer lens is provided with a microdisplay 17 for generating projected image signals; the front of the optical synthesizer lens is provided with an electrically controlled dimming screen that can be set to a transparent state; the dimming screen is an electroluminescence color-modulating and dimming material screen; the selection range of the electroluminescence color-modulating and dimming material screen includes but is not limited to a liquid crystal display dimming screen LCD or an organic electroluminescence display dimming screen OLED;

the microdisplay comprises a driving module; the driving module is connected to the electrically controlled dimming screen that can be set to a transparent state, and can control part or all of the area of the electrically controlled dimming screen to a transparent state;

when the glasses display is working, the area of the electrically controlled dimming screen that is not turned into an opaque state is a transparent area; the wearer can see the environment behind the electrically controlled dimming screen through the transparent area; the driving module drives the electrically controlled dimming screen so that the opaque area of the electrically controlled dimming screen corresponds to the content area of the projected image, which enables the content area of the projected image to be displayed at the opaque area of the electrically controlled dimming screen in the user's field of vision; the content area in the projected image is adjustable in size.

The accompanying mouse is a sliding touch mouse located between two keyboards or on the waistband, or a ring mouse of the prior art worn on the fingers of the waistband wearer, or a smartphone touch screen mouse equipped with the screen touch mouse APP on the waistband body; any one of the three kinds of mice can be cooperated with the left keyboard and the right keyboard to implement mobile man-machine interaction for inputting control instructions to the smartphone;

when it is not necessary to cooperate with the keyboard, a small wireless mouse or a Bluetooth touchpad mouse can be used alone in the pocket of the waistband wearer to implement mobile man-machine interaction for inputting control instructions to the smartphone.

The waistband body is provided with an auxiliary power supply 14, and the left side or the right side of the auxiliary power supply is installed with an auxiliary power supply controller 141 electrically connected to the auxiliary power supply; the controller is provided with a charging control module for directly connecting the smartphone, the left and right keyboards, the touch mouse to supply power for battery life, a docking station module, and an expansion external connection port; the expansion external connection port includes but is not limited to an external charging port, an external video port, an external audio port, a TF/SD card port, and a USB port; the auxiliary power supply provides the data cable connection position plug for the smartphone, which extends the multi-device interface outside the smartphone and connects directly to supply power, so as to solve the problem of poor battery life of traditional mobile phones, frequent charging and connection of multi-device expansion outside the machine.

The mobile operating system includes iOS, Android, or Harmony OS; the PC desktop operating system includes Win10, YOZO, RedFlag Linux, or Remix OS;

a man-machine interaction method of the glasses waistband-type computer device, wherein it adopts the glasses waistband-type computer device of Claim 1 or 2; the left and right keyboards and at least one accompanying mouse are connected to the smartphone, and the man-machine interaction interface of the Windows operating system is used to select one display on the display screen of the smartphone or the display screen of the glasses display in a single-screen mode, or it can be displayed on the display screen of the smartphone and the display screen of the glasses at the same time in a synchronous or extended manner to implement a mobile man-machine interaction that can be used when walking;

when mobile man-machine interaction is implemented, a PC desktop computer operating system can be used for the smartphone; the PC desktop computer operating system is either a PC desktop computer operating system of the cloud host called by the cloud computer APP on the smartphone, or a PC desktop computer operating system installed in the smartphone; the operating system installed in the smartphone and the original pre-installed mobile operating system can be switched with each other.

the mobile man-machine interaction method brings PC computers that have not entered the mobile field for many years into the mobile field, so that new technologies such as robots, big data, artificial intelligence and the Internet of Things can have a mobile platform with more efficient control;

the mobile man-machine interaction method enables cloud computing, which accounts for the majority of scientific and technological productivity calculations, to enter the mobile field, and simultaneously enables the operating system software of various desktop PC computers to enter the mobile field without modification, which solves a longstanding problem.

The mobile man-machine interaction further comprises a pair of headsets on the glasses display provided on the left and right ears, and the headsets implement man-machine interaction for inputting and receiving audio information for the smartphone; the headset are connected to the smartphone in a wired manner or a wireless including a Bluetooth manner.

When the computer device needs to be used for publicity or to beautify the device, the device user can operate the smartphone to display video or display images through the display screen.

The smartphone is provided with an APP that uses a navigation module to detect the user's walking speed, and automatically or manually adjusts the size of the content area in the projected image according to the walking speed;

when the user walks fast or is in a running state, the content area can be automatically or manually adjusted to a smaller man-machine interaction output screen in the shape of a moving banner at the lower part of the user's field of vision;

when the user rambles, the content area can be automatically or manually adjusted to the size of the lower part of the user's field of vision, such as the man-machine interaction output screen of the laptop display screen or the PC desktop computer display screen;

when the user stops walking or sits down, the content area can be automatically or manually adjusted to a man-machine interaction output image with a size in the center of the user's field of vision, such as a wall-mounted large-screen display.

The smartphone of the glasses waistband-type computer device comprises a 5G communication module, which can indirectly call various cloud computing hosts of different operating systems at a high speed by means of built-in APPs, and can also implement man-machine interaction with laptops, PC desktop computers, TVs, wall-mounted large-screen displays, projection equipment, VR equipment, AR equipment wired connection or wireless projection screen connection in addition to glasses displays.

A use method of the glasses waistband-type computer device, wherein the glasses display of Claim 1 or 2 comprises a glasses bracket worn on the head, and the glasses bracket is equipped with a pair of optical synthesizer lenses; the peripheral side of the optical synthesizer lens is provided with a microdisplay for generating projected image signals, and the content area in the projected image is adjustable in size; the front of the optical synthesizer lens is provided with an electrically controlled dimming screen, and the microdisplay comprises a driving module; the driving module is connected to the electrically controlled dimming screen that can be set to a transparent state, and can control part or all of the area of the electrically controlled dimming screen to a transparent or opaque state;

when all areas of the electrically controlled dimming screen are controlled to a transparent state, the optical synthesizer lens superimposes the projected image with adjustable size of the content area from the microdisplay on the image formed from the real environment field of view through the electrically controlled dimming screen, to form the display image output of AR with screens of different sizes, which enables the glasses waistband-type computer device with the movable keyboards and mouse to be a movable interactive AR mobile computer with various sizes of screen displays;

when all areas of the electrically controlled dimming screen are controlled to an opaque state, there is only the display image output of the VR formed by the VR projection with the content area of the microdisplay adjustable in size on the optical synthesizer lens, which enables the glasses waistband-type computer device with the movable keyboards and mouse to be a movable interactive VR mobile computer with various sizes of screen displays;

when the local area of the electrically controlled dimming screen matches the adjusted display shape and size from the projected content area of the microdisplay and is controlled to an opaque state, and the remaining areas around the local area are controlled to a transparent state, the optical synthesizer lens superimposes the projected image from the microdisplay on the opaque image of the electrically controlled dimming screen to form a superimposed image, and the superimposed image is combined with the surrounding real image formed by the real environment through the electrically controlled dimming screen in the user's field of vision, so that the user's field of view has an image and display area similar to a PC display screen, which enables the glasses waistband-type computer device with the movable keyboards and mouse to be a mobile interactive wearable mobile computers with various sizes of computer display screens.

Embodiment 1

A glasses waistband-type computer device, comprising a waistband body 10, wherein the middle of the front of the waistband body 10 is detachably installed with a smartphone 12, and the smartphone 12 can be mounted on the waistband or carried by the user when in use; the front of the waistband body 10 is further provided with a left keyboard 11 located on the left side of the waistband wearer's navel and a right keyboard 13 located on the right side of the waistband wearer's navel; the left and right keyboards are connected to the smartphone 12 in a wired manner or a wireless including a Bluetooth manner; Bluetooth wireless connection can be used between the left and right keyboards and the smartphone, or an OTG data cable can be used for wired connection; the glasses waistband-type computer device can be used as a host of an external display device (such as laptops, PC desktop computers, wall-mounted large-screen displays, VR glasses or mobile phone projectors), and can be connected to external display devices by using a smartphone, and can be connected through Bluetooth or wireless screen projection; the waistband-type computer host is used to realize the mobile man-machine interaction with external display devices, so as to expand the function of the glasses waistband-type computer device, and through the VR glasses, a VR display or an AR display in the field of view of the glasses can be output to the wearer.

The smartphone uses the operating system of the mobile terminal smartphone or the operating system of the PC desktop computer, and can be switched with each other, and is used indirectly through the cloud computer APP installed on the smartphone; the wearer can use the smartphone anytime and anywhere while walking, use the operating system of the PC desktop computer, and control the keyboards and mouse of the glasses waistband-type computer device to input control instructions for the smartphone, to implement the information input between the wearer and the smartphone, and simultaneously view the calculation result output by the smartphone or the glasses display or external display devices connected to the smartphone, so as to implement and complete the mobile man-machine interaction; the host makes the man-machine interaction method of the existing technology and productivity computing used indoors into the mobile terminal smartphone, and becomes a mobile man-machine interaction method.

For the operating system used by the smartphone, except that one of the operating systems such as iOS, Android, Harmony OS, etc. of is initially installed on the smartphone, another PC computer such as one of the operating systems of Win10, YOZO, RedFlag Linux, Remix OS, etc., is installed in the smartphone for direct use or installed in the cloud computer host, or using the existing technology to install dual operating system technology, which is used indirectly through the cloud computer APP installed in the smartphone.

In the embodiment, the smartphone 12 can is a screen folding smartphone; the left keyboard 11 and the right keyboard 13 are both folding keyboards; the left keyboard is provided on the waistband surface on the left side of the wearer's navel, the right keyboard is arranged on the waistband surface on the right side of the wearer's navel, and the two keyboards are both folded and stored when not in use; the positional arrangement of the English letters of the keys on the keyboard is the same as the positional arrangement of the English letters of the keys of the qwert keyboard of the prior art, wherein the left keyboard contains at least 15 letter keys of Q, W, E, R, T, A, S, D, F, G, Z, X, C, V, and B, which are operated by the waistband wearer's left hand, and the right keyboard contains at least 11 letter keys of Y, U, I, O, P, H, J, K, L, N, and M, which are operated by the waistband wearer's right hand; the English letters are arranged in the direction that the foot of the word faces the waistband wearer's head, and the head of the word faces the waistband wearer's foot; the left keyboard and the right keyboard can be used in conjunction with a sliding touch mouse located on the waistband between the two keyboards, or can be used in conjunction with a ring mouse in the prior art worn on the fingers of the waistband wearer, or can also be used in conjunction with the smartphone equipped with a screen touch mouse APP; all three control modes can implement mobile man-machine interaction for inputting control instructions to the smartphone; when it is not necessary to cooperate with the keyboard, a small wireless mouse or a Bluetooth touchpad mouse can be used alone in the pocket of the waistband wearer to implement mobile man-machine interaction for inputting control instructions to the smartphone.

In the embodiment, the back of the waistband body 10 is provided with an auxiliary power supply 14, and the right side of the waistband body 10 is installed with an auxiliary power supply controller 141 electrically connected to the auxiliary power supply 14; the auxiliary power supply controller 141 is provided with a charging control module for directly connecting the smartphone, the keyboards, the touch mouse to supply power for battery life, a docking station module, and an expansion external connection port; the expansion external connection port includes but is not limited to an external charging port, an external video port, an external audio port, a TF/SD card port, and a USB port; the auxiliary power supply 14 provides the data cable connection position plug for the smartphone.

The invention provides a practical glasses waistband-type computer device for introducing technology and productivity calculation into the mobile Internet, which allows the commonly used PC computer operating system software to enter the mobile field immediately without any modification, and makes up for the shortcomings of the key technologies of mobile man-machine interaction that have existed for many years; the glasses waistband-type computer device according to the invention can collect the scientific and technological productivity ecological resources of traditional PC computers and the entertainment service ecological resources of smartphones in one machine, can complete the work that a common laptop computer or PC computer or wall-mounted TV can complete in one machine, can provide a new mobile man-machine interaction method and a new device thereof with new technologies of VR and AR, and can also be used as a new mobile platform for robotics, cloud computing and 5G technology, which is a multi-functional wearable computer with various functions commonly used in today's computers.

Embodiment 2

When all areas of the electrically controlled dimming screen are controlled to a transparent state, the optical synthesizer lens superimposes the projected image with adjustable size of the content area from the microdisplay on the image formed from the real environment field of view through the electrically controlled dimming screen, to form the display image output of AR; the AR display image output of the glasses display is cooperated with the folding keyboards on the waistband and the man-machine interaction input device of the mouse, together with the smartphone, so that the invention has the purpose of using AR technology in a high-efficiency and high-skilled man-machine interaction mode of existing technology and productivity under mobile conditions, which improves the ability to use AR technology and expands the scope of application of the technology;

when all areas of the electrically controlled dimming screen are controlled to an opaque state, there is only the display image output of the VR formed by the VR projection with the content area of the microdisplay adjustable in size on the optical synthesizer lens; the VR display image output of the glasses display is cooperated with the folding keyboards on the waistband and the man-machine interaction input device of the mouse, together with the smartphone, so that the invention has the purpose of using VR technology in a high-efficiency and high-skilled man-machine interaction mode of existing technology and productivity under mobile conditions, which improves the ability to use VR technology and expands the scope of application of the technology;

when the local area of the electrically controlled dimming screen matches the adjusted display shape and size from the projected content area of the microdisplay and is controlled to an opaque state, and the remaining areas around the local area are controlled to a transparent state, the optical synthesizer lens superimposes the projected image from the microdisplay on the opaque image of the electrically controlled dimming screen to form a superimposed image, and the superimposed image is combined with the surrounding real image formed by the real environment through the electrically controlled dimming screen in the user's field of vision, so that the user's field of view has an image and display area similar to a PC display screen; the image display output of the glasses display similar to the PC display screen is cooperated with the folding keyboards on the waistband and the man-machine interaction input device of the mouse, together with the smartphone, so that the invention has the purpose of using similar existing notebook computers, desktop PC computers, and wall-mounted large-screen computers under mobile conditions, which improves the ability to use the existing computer technology and expands the scope of application of the technology.

Unless otherwise stated in any of the technical solutions disclosed by the invention, if it discloses a numerical range, then the disclosed numerical range is the preferred numerical range, and any person skilled in the art should understand: the preferred numerical range is only a numerical value with obvious or representative technical effect among the many feasible numerical values. Since the numerical values are too numerous to be exhaustive, only some numerical values are disclosed in the invention to illustrate the technical solutions of the invention, and the above numerical values shall not constitute a limitation on the protection scope of the invention.

If the invention discloses or involves parts or structures that are fixedly connected to each other, then, unless otherwise stated, fixed connection can be understood as: detachable fixed connection (for example, by bolts or screws), and can also be understood as: non-detachable fixed connection (such as riveting and welding); of course, the mutual fixed connection can also be replaced (except that it is obviously impossible to use integral forming process) by an integrated structure (for example, integrally formed by a casting process).

In addition, unless otherwise stated, the terms used in any of the technical solutions disclosed in the invention used to represent positional relationships or shapes include states or shapes that are similar or close thereto.

Any component provided by the invention may be assembled from a plurality of individual components, or may be a single component manufactured by an integral forming process.

Finally, it should be noted that: the above embodiments are only used to illustrate the technical solutions of the invention but not to limit them; although the invention has been described in detail with reference to the preferred embodiments, those of ordinary skill in the art should understand that: the specific embodiments of the invention can still be modified or some technical features can be equivalently replaced without departing from the spirit of the technical solutions of the invention, which shall be included in the scope of the technical solutions claimed in the invention.

What is claimed is:

1. A glasses waistband-type computer device, comprising a waistband body, wherein the waistband body is detachably installed with a smartphone, and is further provided with a left keyboard and a right keyboard; the left keyboard and the right keyboards are connected to the smartphone in a wired or wireless manner; the smartphone is a bar smartphone or a screen folding smartphone; the left keyboard and the right keyboard are both folding keyboards; the positional arrangement of English letters of keys on the keyboard is the same as the positional arrangement of English letters of keys of a QWERTY keyboard, wherein the left keyboard contains 15 letter keys of Q, W, E, R, T, A, S, D, F, G, Z, X, C, V, and B, which are operated by a waistband wearer's left hand, and the right keyboard contains 11 letter keys of Y, U, I, O, P, H, J, K, L, N, and M, which are operated by a waistband wearer's right hand; the glasses waistband-type computer device is further provided with a glasses display connected by a wired connection or a wireless screen projection connection for receiving information displayed by the smartphone; when the glasses display is working, a projected image to be displayed is sent to the wearer's eyes through an optical path; a content area in the projected image is adjustable in size, at the same time, the glasses display forms an opaque area with adjustable size by an electrically controlled dimming screen in front of an optical synthesizer lens, so that the content area of the projected image projected to the wearer's field of vision is displayed in the opaque area of the electrically controlled dimming screen in the wearer's field of view; the glasses waistband-type computer device is further connected with a mouse; the waistband body is further installed with an auxiliary power supply device.

2. The glasses waistband-type computer device of claim 1, wherein the glasses display comprises a glasses bracket worn on a wearer's head, and the glasses bracket is equipped with a pair of optical synthesizer lenses; a microdisplay for generating projected image signals; the front of the optical synthesizer lens is provided with the electrically controlled dimming screen that is set to a transparent state; the dimming screen is an electroluminescence color-modulating and dimming material screen; the selection range of the electroluminescence color-modulating and dimming material screen includes a liquid crystal display dimming screen LCD or an organic electroluminescence display dimming screen OLED; the microdisplay comprises a driving module; the driving module is connected to the electrically controlled dimming screen that is set to a transparent state, when the glasses display is working, the area of the electrically controlled dimming screen that is not turned into an opaque state is a transparent area; the driving module drives the electrically controlled dimming screen so that the opaque area of the electrically controlled dimming screen corresponds to the content area of the projected image, which enables the content area of the projected image to be displayed at the opaque area of the electrically controlled dimming screen in the wearer's field of vision; the content area in the projected image is adjustable in size.

3. The glasses waistband-type computer device of claim 1, wherein the mouse is a touch pad mouse located between the left keyboard and the right keyboards or on the waistband, or a ring mouse worn on a fingers of the waistband wearer, or a smartphone touch screen mouse equipped with a screen touch mouse APP on the waistband body; any one of the three kinds of mice is cooperated with the left keyboard and the right keyboard to implement mobile man-machine interaction for inputting control instructions to the smartphone.

4. The glasses waistband-type computer device of claim 1, wherein the waistband body is provided with an auxiliary power supply device, a controller electrically connected to the auxiliary power supply device; the controller is provided with a charging control module for directly connecting the smartphone, the left and right keyboards, a touch mouse to supply power for battery life, a docking station module, and an expansion external connection port; the expansion external connection port includes an external charging port, an external video port, an external audio port, a TF/SD card port, and a USB port; the auxiliary power supply device provides a data cable connection position plug for the smartphone, which extends the multi-device interface outside the smartphone and connects directly to supply power.

* * * * *